(12) United States Patent
Edwards et al.

(10) Patent No.: US 6,824,485 B2
(45) Date of Patent: Nov. 30, 2004

(54) POWER TRANSMISSION BELT

(75) Inventors: Charles O. Edwards, Arvada, CO (US); Lance D. Miller, Highlands Ranch, CO (US); Douglas R. Sedlacek, Englewood, CO (US)

(73) Assignee: The Gates Corporation, Denver, CO (US)

( * ) Notice: Subject to any disclaimer, the term of this patent is extended or adjusted under 35 U.S.C. 154(b) by 200 days.

(21) Appl. No.: 10/192,669

(22) Filed: Jul. 9, 2002

(65) Prior Publication Data

US 2004/0009839 A1 Jan. 15, 2004

(51) Int. Cl.[7] .............................................. F16G 5/20
(52) U.S. Cl. ..................................... 474/260; 474/266
(58) Field of Search ........................ 474/260, 263–266, 474/271

(56) References Cited

U.S. PATENT DOCUMENTS

| | | | |
|---|---|---|---|
| 4,048,865 A | 9/1977 | Bell et al. .................. 74/231 R |
| 4,099,422 A | 7/1978 | Cicognani et al. ......... 74/231 C |
| 4,892,510 A | 1/1990 | Matsuoka et al. .......... 471/252 |
| 4,896,765 A | 1/1990 | Loose ......................... 198/847 |
| 5,260,123 A | 11/1993 | Hergenrother et al. ....... 428/246 |
| 5,308,516 A | 5/1994 | Chiddick ..................... 252/30 |
| 5,391,627 A | 2/1995 | Araki et al. ................. 525/274 |
| 5,531,649 A | 7/1996 | Osako et al. ................ 474/205 |
| 5,534,169 A | 7/1996 | Vinci .......................... 508/460 |
| 5,860,883 A | 1/1999 | Jonen et al. ................ 474/205 |
| 5,898,022 A | 4/1999 | Maples ....................... 508/113 |
| 6,132,328 A | * 10/2000 | Kinoshita et al. ........... 474/260 |
| 6,464,607 B1 | * 10/2002 | Rosenboom et al. ........ 474/263 |
| 6,609,990 B2 | * 8/2003 | Kopang ....................... 474/264 |
| 2002/0183153 A1 | 12/2002 | Patterson et al. ........... 474/263 |
| 2003/0017900 A1 | 1/2003 | Kopang ....................... 474/260 |

FOREIGN PATENT DOCUMENTS

| | | | | |
|---|---|---|---|---|
| EP | 0 784 075 A1 | 7/1997 | ........... C08L/23/16 |
| EP | 1 108 750 A1 | 6/2001 | ........... C08L/23/16 |
| EP | 1 154 171 A1 | 11/2001 | ............. F16G/1/08 |

OTHER PUBLICATIONS

"Journal of Applied Mechanics"Frictional Vibrations by David Sinclair, Manville, N.J., pp. 207thru 214, Jun. 1955.

* cited by examiner

*Primary Examiner*—Thomas R. Hannon
(74) *Attorney, Agent, or Firm*—J. A. Thurnau, Esq.; C. H. Castleman, Esq.; S. G. Austin, Esq.

(57) ABSTRACT

A belt having a region comprising a non-woven material region on a pulley engaging surface. The non-woven region is infused with an elastomeric compound. A predetermined amount of metal salt of carboxylic acid is included in the elastomeric compound during compounding. The metal salts of carboxylic acid significantly reduce or eliminate slip noise.

53 Claims, 3 Drawing Sheets

POWER TRANSMISSION BELT

FIELD OF THE INVENTION

The invention relates to power transmission belts having a pulley engaging surface comprising a non-woven region infused with an elastomer having a metal salt of carboxylic acid.

BACKGROUND OF THE INVENTION

It is known in the art to make power transmission belts from elastomeric materials having an embedded tensile member. The belts may describe a multi-rib, toothed, v-belt, or flat profile. The belts run in pulleys having a matching profile.

It is known that the rib flank surfaces of V and multi-v rib belts are subject to sliding wear, temperature extremes, normal, tangential and frictional forces that cause belt noise, rib surface sloughing, slipping, and chatter. It is also known that power transmission capacity and belt longevity are functions of several factors, including the type of material contacting the pulley surfaces. These are currently addressed by incorporating a high loading of various fibers into the mix of the undercord materials. These fibers, or portions of them, are exposed when the V profile is cut or ground to form the belt from the cured belt slab. The resulting surface is a combination of the base polymer and exposed fibers. This technique is limited with regard to an engineering approach for composite design, and/or controlling friction, noise, and slippage. It also creates a stiff structure that resists bending, which can contribute to belt rib cracking and shortened belt life.

Representative of the art is U.S. Pat. No. 4,892,510 (1990) to Matsuoka which discloses a v-ribbed belt having a surface layer comprising a non-woven fabric at the outer surface vulcanized to ribs solely made of rubber.

Also representative of the art is U.S. Pat. No. 5,860,883 (1999) to Jonen et al. which discloses a power transmission belt having a compression rubber layer having a rubber composition including a hydrogenated nitrile rubber, an unsaturated carboxylic acid metal salt, and an inorganic peroxide.

Reference is also made to copending U.S. application Ser. No. 10/120,626 filed Apr. 10, 2002 and U.S. application Ser. No. 09/908,235 filed Jul. 18, 2001.

What is needed is a power transmission belt having a surface comprising non-woven material infused with an elastomeric compound having a predetermined amount of metal salt of carboxylic acid. What is needed is a power transmission belt having a surface comprising non-woven material infused with an elastomeric compound having a predetermined amount of metal salt of carboxylic acid to reduce a slip noise. What is needed is a power transmission belt having a surface comprising non-woven material infused with an elastomeric compound having a predetermined amount of zinc stearate to reduce a slip noise. The present invention meets these needs.

SUMMARY OF THE INVENTION

The primary aspect of the invention is to provide a power transmission belt having a surface comprising non-woven material infused with an elastomeric compound having a predetermined amount of metal salt of carboxylic acid.

Another aspect of the invention is to provide a power transmission belt having a surface comprising non-woven material infused with an elastomeric compound having a predetermined amount of metal salt of carboxylic acid to reduce a slip noise.

Another aspect of the invention is to provide a power transmission belt having a surface comprising non-woven material infused with an elastomeric compound having a predetermined amount of zinc stearate to reduce a slip noise.

Other aspects of the invention will be pointed out or made obvious by the following description of the invention and the accompanying drawings.

The invention comprises a belt having a region comprising a non-woven material region on a pulley engaging surface. The non-woven region is infused with an elastomeric compound. A predetermined amount of metal salt of carboxylic acid is included in the elastomeric compound during compounding. The metal salt of carboxylic acid in the elastomeric compound significantly reduces or eliminates slip noise.

DETAILED DESCRIPTION OF THE EMBODIMENT

Figure 1:
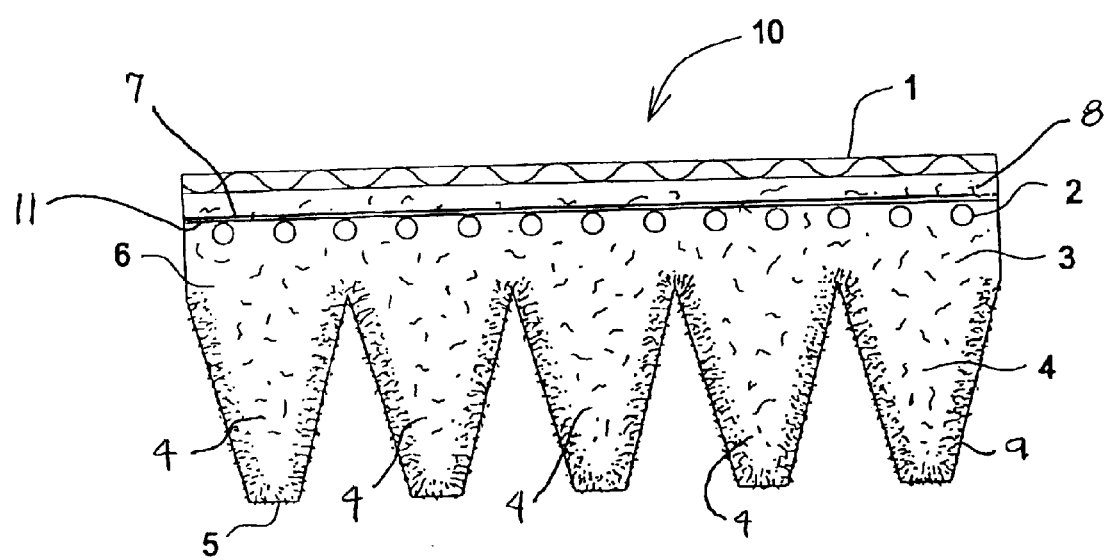
FIG. 1 is a side cross-sectional view of the inventive belt.

FIG. 1 is a cross-sectional view of the inventive belt 10. Belt 10 comprises body 3 and pulley engaging ribs 4 running in a longitudinal direction. Belt 10 also comprises load carrying tensile members 2 that run along a longitudinal axis of the belt. Tensile members 2 may comprise aramid or polyester.

Ribs 4 further comprise fibers 6 dispersed throughout the elastomeric material. The elastomeric material may comprise EPDM, SBR, HNBR, polychloroprene and blends of these and their equivalents. Belt 10 may also comprise a jacket 1 applied to an overcord 8. Jacket 1 may comprise a fabric material of nylon, cotton or other appropriate equivalent fabrics. Jacket 1 may also comprise a thermoplastic or thermoset material, such as nylon, polyurethane, polyethylene and their equivalents.

Cross-cord layer 7 is adjacent to tensile members 2 across a width of the belt. Cross-cord layer 7 is substantially non-porous so that essentially no elastomeric material penetrates cross-cord layer 7 during a molding process, thereby maintaining a proper tensile member position within the belt. Cross-cord layer 7 may comprise woven or non-woven material, for example non-porous tire cord. A thin gum layer 11 may be disposed between cross-cord layer 7 and tensile members 2 in order to cushion tensile members 2 and thereby avoid abrading the tensile members.

Ribs 4 may comprise any number of ribs and any profile required by a user. FIG. 1 depicts a multi-ribbed profile. The belt may also comprise a single rib v-belt profile.

Pulley engaging non-woven region 5 comprises a random array of non-woven material co-mingled and infused with the elastomer of the body 3 and ribs 4, thereby forming region 5. Region 5 does not have a discrete boundary between the non-woven containing area and the body 3. Due to the co-mingling, both non-woven material and elastomer are present at a pulley engaging surface 9.

Non-woven region 5 may comprise a single layer or a plurality of overlaid layers of non-woven material infused with elastomeric material. Further, the non-woven region does not have the characteristic of uniformly spaced and aligned fibers as in a woven cloth or textile. Since the fibers comprising the non-woven region are randomly oriented, this reduces the creation and support of natural frequency harmonics one would expect in a more homogeneous material, i.e., where the fibers are more oriented. These harmonics comprise audio oscillation (noise) as well as low frequency oscillations of the belt vibrating between pulleys. A non-woven region comprising randomly oriented fibers tends to substantially damp these oscillations.

Non-woven materials may also be chosen to give a required frictional characteristic, permeation, thermal and wear resistance. A friction modifier can be used in the non-woven region to control the coefficient of friction of the outer surface of the non-woven region. The friction modifier may be part of the rubber that infuses the non-woven region or may be applied to the non-woven material before assembly of the belt.

By way of example and not of limitation, friction modifiers may include waxes, oils, graphite, molybdenum disulfide, PTFE, mica, talc, and various blends and equivalents thereof. A friction modifier may also comprise a metal salt of carboxylic acid as further described herein.

The non-woven material is cellulose based and has a basis weight in the range of 10 lbs./3K sq.ft. up to 45 lbs./3K sq.ft. The porosity of the non-woven material is in the range of 100 to 370 CFM per ft.$^2$ per ½" $H_2O$ $\Delta P$. The thickness of the non-woven region 5 is in the range of 0.025 mm to 3 mm. The tensile strength in the machine direction is in the range of 230 to 1015 g/inch. The tensile strength in the cross direction is in the range of 66 to 250 g/inch.

An exemplary embodiment uses a basis weight of 10 lbs./3K sq.ft.; porosity of 100 CFM per ft.$^2$ per ½" $H_2O$ $\Delta P$; tensile strength in the machine direction 550 g/inch; tensile strength in the cross direction 250 g/inch. The non-woven comprises 50% softwood and 50% hardwood.

Fibers 6 are included in the matrix of the elastomeric body 3 and overcord 8, each separate from the non-woven region 5. Fibers 6 further decrease rib surface sloughing and chatter. The fibers may include aramid, carbon, polyester, polyethylene, fiberglass, nylon and blends and equivalents thereof. Other organic fibers may include wool, silk, hemp, cotton, and blends and equivalents thereof. The amount of fibers used in the rib elastomeric may be in the range of 0.01 to 20 parts fiber per hundred parts of rubber (PHR). An exemplary embodiment utilizes 0.01 to 5 parts fiber per hundred parts of rubber. The non-woven region allows a dramatic reduction in the percentage of flock or fiber loading required in the undercord rib materials. This change has resulted in improved belt performance due to enhanced resilience and bending of the undercord constructions.

A metal salt of carboxylic acid (MCA) is included in the elastomer compound to control slip noise. The fatty acid used in the MCA may be selected from the group characterized as linear or branched, saturated or unsaturated fatty acids. More particularly, the fatty acid used in the MCA may be selected from the group characterized as 12 carbon atom to 24 carbon atom carboxylic acids. The fatty acid may be selected from the group comprising saturated fatty acids including lauric, myristic, oleic, linoleic, palmitic, margaric, stearic, arachidic, behenic or lingoceric acid and blends and equivalents thereof. The melting point for each of the foregoing fatty acids ranges from approximately 44.2° C. (lauric) up to 84.2° C. (lingoceric). These temperatures are generally in the operating range of the inventive belt. The fatty acids may be selected from the group characterized as carboxylic acids with the same numbers of carbon atoms, 12 to 24, but having one or more carbon-carbon double bonds, i.e. unsaturated, for example, erucic acid.

Metals used with the fatty acid in the MCA may be selected from Group IA, IIA, IIIA, IB, IIB, IVB, VIB, VIIB, or VIII of the Periodic Table, including without limitation beryllium, barium, titanium, chromium, molybdenum, manganese, iron, cobalt, nickel, copper, silver, cadmium, tin, lead, antimony, zinc, calcium, magnesium, sodium, lithium, potassium, or aluminum.

MCA is used in the inventive belt, in lieu of the fatty acids without a metal atom, because fatty acids can inhibit peroxide cure of an elastomer. The metal atom on the acid group inhibits the detrimental effect of the acid group on the elastomeric peroxide cure. However, fatty acids not including a metal atom may be used to practice the invention if the detrimental effects of the acid group on the peroxide cure are of diminished importance to the product or process.

The MCA is present in the elastomeric material formulation in the range of approximately 2–15 PHR. For MCA concentrations above the solubility limit, for example in the range of approximately 2 PHR up to approximately 10 PHR, a desirable portion of the MCA presents at the surface 9 of the belt non-woven region 5. The excess MCA on the belt surface 9 interacts with a metal pulley groove.

The presence of the surplus MCA at the non-woven surface 9 acting as a frictional modifier significantly improves the slip noise performance of the inventive belt. This is believed to occur because the metal atom is relatively weakly bonded to the fatty acid. As a result the metal atom/fatty acid bond can be easily broken, making the fatty acid available for bonding or reforming to another metal atom, for example, on the metallic surface of a pulley, thereby modifying a frictional characteristic. Modification of the frictional characteristic in this manner reduces or eliminates a slip noise between the belt and a pulley.

For MCA concentrations above 10 PHR, an over excess of MCA may be present on belt surface 9 regardless of operating temperature, which has an adverse effect on belt interaction with a pulley by a loss of torque transmitting capacity.

On the other hand, it is believed that concentrations of the fatty acids less than 2 PHR are below the solubility limit for the MCA in the elastomeric material, thereby limiting availability of the MCA at the non-woven belt surface.

As the number of carbon atoms in the fatty acids increase beyond 24, the solubility of the carboxylic acid in the elastomeric significantly decreases. For example, benzene and cyclohexane have similar solubility characteristics as the EPDM elastomeric material. For carboxylic acid having 10 carbons, 3980 grams of acid/liter of benzene are soluble. A liter of benzene has a mass of roughly 876 grams. In the case of stearic acid (16 carbons) only 73 grams of acid/liter of benzene are soluble. As one goes above the solubility limit of a material in a solvent, the material comes out of solution, in some cases in a crystalline form. With rubber or elastomers this can be manifest by excess material on the rubber surface. The high solubility of the low carbon fatty acids allows very little to be available at the surface 9 of the non-woven region. The diminished solubility for the higher carbon atom acids (in excess of 24 carbon atoms) results in an over excess of MCA being present on the surface of the belt regardless of temperature, which adversely affects performance.

An elastomeric material formulation for the belt is as follows. The formulation is exemplary and is not offered to limit other possible formulations.

| Material | PHR (Parts per Hundred elastomer) |
|---|---|
| EPDM | 100.0 |
| N330 Carbon black | 62 |
| Zinc Stearate | 5.7 |
| Zinc Oxide | 2.9 |
| Process Oil | 10.0 |
| TMQ Antioxidant | 0.96 |
| Zinc Dimethacrylate (w/Retarder) | 15.0 |
| Nylon Floc | 4.8 |
| Vul-Cup (60% Active) Peroxide | 3.43 |

The MCA may be added to the elastomeric material directly or formed in situ. More particularly and by way of example, zinc stearate can either be added directly to the rubber formulation or can be formed in situ by the use of zinc oxide and stearic acid in the compound, which react in a known manner during vulcanization to form zinc stearate.

The inventive belt compound also has reduced viscosity which improves processing for calendering and milling, improves release from mold surfaces, improves belt durability, as well as reducing or eliminating slip noise generation, while providing excellent torque transmission and enhanced V wedging.

Regarding the elastomeric material formulation, other conventional elastomeric additives, process and extender oils, antioxidants, waxes, pigments, plasticizers, softeners and the like may be added according to common rubber processing practice without departing from the present invention. For example, in a preferred embodiment of the present invention, the elastomeric material also contains carbon black, a plasticizer, antioxidants, cure accelerators and a cure retarder.

For utilization in an embodiment of the present invention, the elastomer composition optionally but preferably includes one or more additional conventional rubber composition additives, e.g., fillers, oils, vulcanization agents, activators and accelerators; scorch retarders, tackifiers, processing aids etc., in amounts conventionally employed, to form elastomeric materials useful in the practice of the present invention. For example, suitable fillers may be reinforcing, non-reinforcing, semi-reinforcing types or combinations of the foregoing, and may include carbon blacks; silica; clay; talc, etc. In particular, such fillers may be employed in the practice of the present invention in amounts of from about 0 to about 200 phr; more preferably of from about 10 to about 150 phr, and most preferably of from about 25 to 100 phr. In those applications wherein static conductivity is desirable, such as in the construction of various vibration dampers, the incorporation of a suitable conductive black may be particularly useful. Plasticizers and/or extender oils or other processing aids may optionally be utilized in any suitable amount, e.g., up to about 300 phr and more preferably up to about 10 phr; vulcanization accelerators and/or retarders may optionally be employed in any suitable amount, e.g. up to about 10 phr; and antioxidant systems may optionally be employed in any suitable amount, e.g. up to about 5 phr may optionally be utilized.

Method of Manufacture

The inventive belt is built up on a mandrel in a series of layers. Elastomeric overcord 8 of the belt is laid-up first. Each succeeding elastomeric layer is laid upon the previously applied layer. Cross-cord layer 7 is applied upon overcord 8. Tensile cords 2 are applied on cross-cord layer 8. A gum layer 11 may be applied between the tensile cords 2 and cross-cord layer 7 in order to provide a cushion for tensile cords 2. The elastomeric undercord or body 3 is then applied over the tensile cords 2. The final layer applied to the build upon the undercord layer 3 is the non-woven material comprising region 5.

The non-woven region may comprise one or more layers of non-woven material. The non-woven layer or layers have the added advantage of allowing gases developed during the curing process to vent or escape from the edges of the mold. Venting of gases from the mold facilitates proper infusion of the elastomeric material into the non-woven material, thereby forming region 5.

The belt build is then subjected to curing pressures and temperatures sufficient to vulcanize and mold the belt. For example the fabrication process may comprise the following once the belt build is placed in the mold;

1) evacuating the air from inside the mold and holding for 1 to 5 minutes;
2) increasing the steam pressure on the outside shell to a range of 175 to 235 psig;
3) after 2 to 10 minutes, increasing the steam pressure on the inside of the mold to a range of 85 to 210 psig;
4) curing for 10 to 20 minutes;
5) decreasing the steam pressure inside the mold to atmospheric pressure;
6) decreasing the steam pressure outside the mold to atmospheric pressure;
7) quenching the mandrel in a cool fluid, such as water;
8) removing the cured belt blank from the mandrel.

Once cooled, the cured belt build is then separated from the mandrel and cut to the appropriate belt widths. The optimum rib shapes are achieved with process pressures on the high end of the range.

Hydraulics or other methods known in the art (pneumatic, mechanical) can also be used to apply pressure to the belt, in conjunction with concurrently applied electric heat for curing in lieu of steam cure. The pressure range for a hydraulic cure is 85 to 500 psig. The temperature range is 250 to 500° F. This method of curing broadens the choice of rubber stocks.

Application of pressure prior to curing infuses the elastomeric material into the non-woven material. The elastomeric material then occupies the interstices between the individual fibers comprising the non-woven material. This results in a region 5 of non-woven material wherein the non-woven materials are co-mingled and infused with the elastomeric material.

Tests

Noise tests were conducted on an exemplary belt constructed using the formula noted previously to compare the inventive belt with belts without zinc stearate on a non-woven pulley contact surface. The results indicated the slip noise generated by the inventive belt is reduced significantly.

The test belt comprised an overcord 8, cross-cord 7, gum layer 11, tensile cords 2, a compression section or body 3, and a non-woven region 5 as described in FIG. 1.

The dry slip noise test is conducted on a two pulley system. A driver pulley has a 139.7 mm diameter. The driven pulley has a diameter of 60 mm. The driver pulley operates at 400 RPM. The ambient temperature is 23° C. A tensile load of 467 N is applied to the driven pulley. Braking is then applied to the driven pulley to induce slip between the belt and the driven pulley. A slip speed is measured between the belt and the driven pulley. The slip noise is measured using a microphone at a midpoint which is displaced 5 inches laterally to a centerline between the pulleys.

The test results are as follows:

| Belt | Slip Noise |
| --- | --- |
| Non-woven region without Zinc Stearate | 111 dB |
| Non-woven region with Zinc Stearate | 83 dB |

One can see that the belt having a predetermined amount of zinc stearate in the elastomeric compound in the pulley engaging non-woven region 5 runs significantly quieter than a belt without the zinc stearate.

Figure 2:
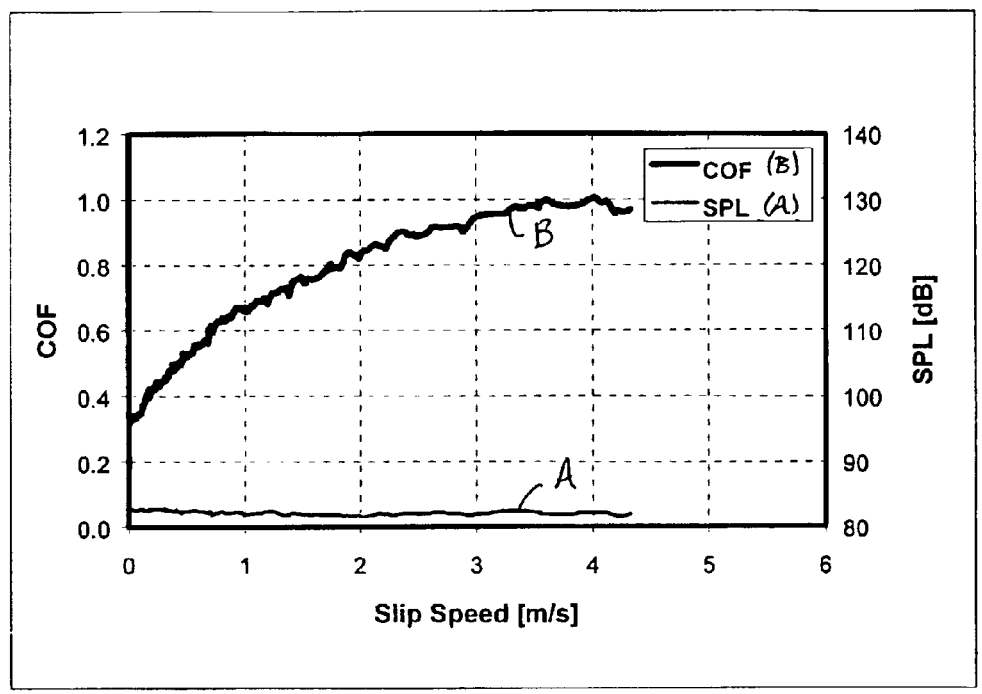
FIG. 2 depicts the slip noise vs. slip speed test results.

FIG. 2 depicts the slip noise vs. slip speed test results. The test is conducted on the pulley configuration shown in FIG. 4. For an operating condition with 90° of wrap around the driven pulley #2 at 180 N applied to pulley #5 in FIG. 4 and 600 RPM, curve A indicates the inventive belt did not emit any slip noise in excess of 82 dB for slip speeds over 4 m/s while retaining excellent torque transmitting capabilities.

Figure 3:
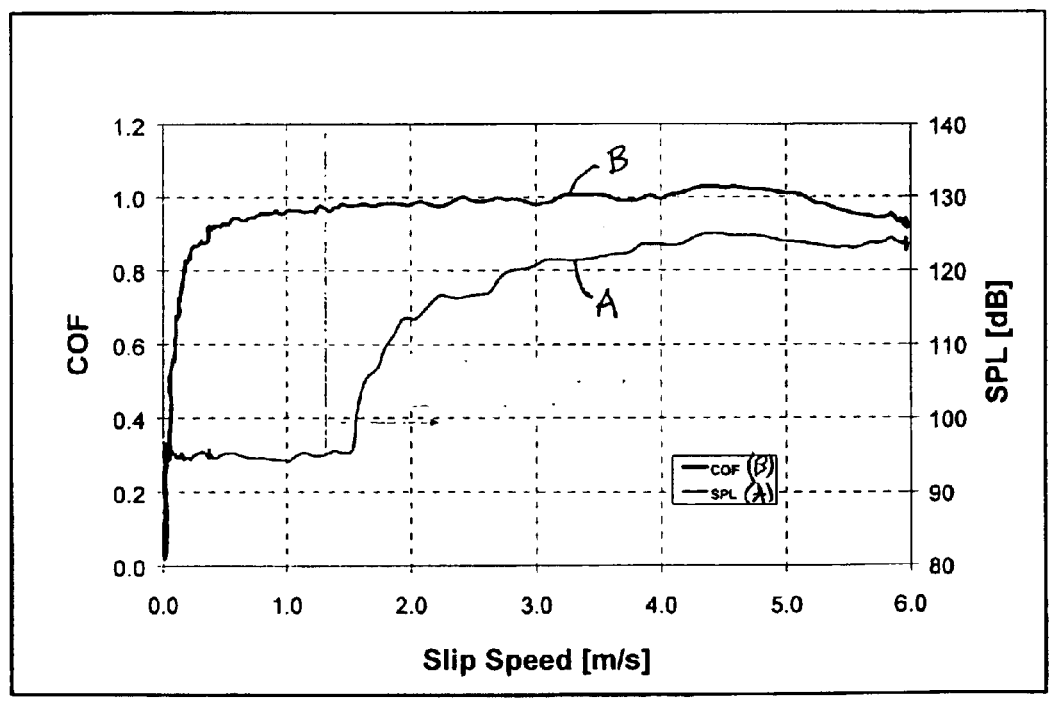
FIG. 3 is a chart depicting slip noise vs. slip speed for a belt not having zinc stearate.

FIG. 3 is a chart depicting slip noise vs. slip speed for a belt not having zinc stearate. This test is also conducted under conditions described for FIG. 2 and on the pulley configuration shown in FIG. 4. Curve A indicates slip noise immediately increases from 82 dB to approximately 95 dB as soon as slipping starts to occur, at 0+ m/s. Curve A indicates the noise significantly increases to approximately 123 dB at slip speeds from approximately 1.5 meters per second (m/s) to approximately 6 m/s. Curve B indicates the co-efficient of friction as a function of slip speed.

Figure 4:
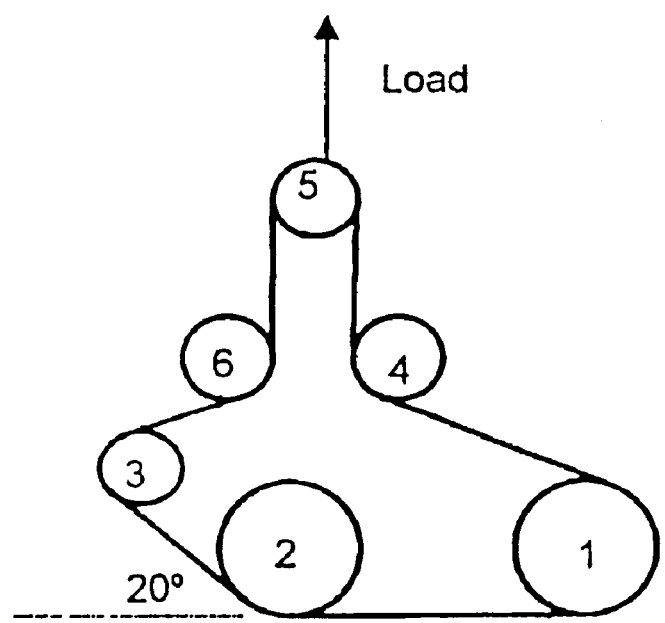
FIG. 4 depicts a test pulley configuration.

The torque carrying capacity test is conducted on the six pulley system as shown in FIG. 4. The pulleys are numbered 1–6. The test conditions are ambient temperature 90° F., belt tension 180 N at pulley #5, torque 0–20 Nm, test pulley speed 400 RPM at pulley #2 clockwise, and pulley #2 wrap angle of 20°. The pulley #2 wrap angle can be varied as needed. Before the test is conducted the pulleys are cleaned with isopropyl alcohol and the belt is run in for 2 minutes before data is collected.

FIGS. 2 and 3 depict the results of the torque carrying capacity test. As can be seen by curve B in FIG. 2 and FIG. 3, for equivalent velocity ranges the effective coefficient of friction (COF) of the inventive belt is consistent with a belt without zinc stearate. This indicates no loss in torque carrying capacity of the inventive belt. Therefore, the inventive belt achieves quiet operation without diminished power transmission capacity.

Several non-woven/MCA combinations are effective in reducing slip noise. The non-woven material composition used in non-woven region 5 may include 100% softwood, a hardwood/softwood blend, a softwood/synthetic blend, and a 100% hardwood. The following are exemplary non-woven composition ratios and are not offered as limitations:

|   | Softwood | Hardwood | Soft/Synthetic |
| --- | --- | --- | --- |
| A | 100% | 0% | 0% |
| B | 50% | 50% | 0% |
| C | 75% | 25% | 0% |
| D | 70% | 0% | 30% |
| E | 85% | 0% | 15% |
| F | 0% | 100% | 0% |

The foregoing ratios are offered as illustrative of a range of ratios for non-woven layer compositions and are not offered by way of limitation.

The synthetic fibers combined with the softwood in the non-woven synthetic softwood blend (D,E) include aramid, carbon, polyester, polyethylene, fiberglass and nylon and blends and equivalents thereof. Other organic fibers that may be used with the softwoods may include wool, hemp, cotton, and blends and equivalents thereof. The 100% hardwood composition (F) may be accomplished using a wood flour or highly processed pulp.

Although forms of the invention have been described herein, it will be obvious to those skilled in the art that variations may be made in the construction and relation of parts without departing from the spirit and scope of the invention described herein.

We claim:

1. A belt comprising:
    a body comprising an elastomeric material and having tensile members extending in a longitudinal direction,
    a cross-cord layer disposed adjacent the tensile members;
    the body having a pulley engaging region having a profile, the pulley engaging region comprising a non-woven material infused with the elastomeric material;
    the elastomeric material having a fiber loading;
    the elastomeric material having a predetermined amount of a metal salt of carboxylic acid; and
    the carboxylic acid is selected from lauric, myristic, oleic, linoleic, palmitic, margaric, stearic, arachidic, behenic or lingoleic acid or a combination of any two or more of the foregoing.

2. The belt as in claim 1 wherein the carboxylic acid is one possessing from about 12 carbon atoms to about 24 carbon atoms.

3. The belt as in claim 1 wherein the metal is selected from beryllium, barium, titanium, chromium, molybdenum, manganese, iron, cobalt, nickel, copper, silver, cadmium, tin, lead, antimony, zinc, calcium, magnesium, sodium, lithium, potassium, or aluminum or a combination of any two or more of the foregoing.

4. The belt as in claim 3 wherein an amount of metal salt of carboxylic acid is in the range of approximately 2 to 15 parts per hundred rubber.

5. The belt as in claim 1, wherein the pulley engaging region further comprises a frictional modifier.

6. The belt as in claim 5, wherein the frictional modifier is selected from waxes, oils, graphite, molybdenum disulfide, PTFE, mica, talc or a combination of any two or more of the foregoing.

7. The belt as in claim 1 wherein the metal salt of carboxylic acid is selected from zinc altercate, calcium stearate or magnesium stearate or a combination of any two or more of the foregoing.

8. The belt as in claim 7 wherein an amount of metal salt of carboxylic acid is in the range of approximately 2 to 15 parts per hundred rubber.

9. The belt as in claim 8, wherein the elastomeric material is selected from EPDM, HNBR, SBR, or chloroprene or a combination of any two or more of the foregoing.

10. The belt as in claim 8, wherein the non-woven material comprises a combination of softwood pulp and hardwood pulp.

11. The belt as in claim 8, wherein the non-woven material comprises softwood pulp.

12. The belt as in claim 11, wherein the softwood pulp comprises cotton.

13. The belt as in claim 8, wherein the non-woven material comprises a combination of softwood pulp and a softwood pulp and synthetic material blend.

14. The belt as in claim 13 wherein the non-woven material comprises from 0% to 70% of the softwood pulp.

15. The belt as in claim 14, wherein the synthetic material is selected from aramid, carbon, polyester, polyethylene, fiberglass and nylon or a combination of any two or more of the foregoing.

16. The belt as in claim 8, wherein the non-woven material comprises a combination of hardwood pulp and a softwood pulp and synthetic material blend.

17. The belt as in claim 8, wherein the non-woven material comprises hardwood pulp.

18. The belt as in claim 8, wherein the fiber loading is in the range of approximately 0.01 to 5 parts per hundred rubber.

19. The belt as in claim 8, wherein the region comprises a multi-ribbed profile.

20. The belt as in claim 8, wherein the region comprises a v-belt profile.

21. The belt as in claim 8, wherein the cross-cord layer comprises woven material.

22. The belt as in claim 8, wherein the cross-cord layer comprises tire cord.

23. A belt comprising:
a body comprising an elastomeric material and having tensile members extending in a longitudinal direction;
a substantially non-porous cross-cord layer disposed adjacent the tensile members;
the body having a pulley engaging region having a profile, the pulley engaging region comprising a non-woven material infused with the elastomeric material;
the elastomeric material having a fiber loading; and
the elastomeric material having a predetermined amount of zinc stearate.

24. The belt as in claim 23 wherein an amount of zinc stearate is in the range of approximately 2 to 15 parts per hundred rubber.

25. A belt comprising:
a body comprising an elastomeric material and having tensile members extending in a longitudinal direction;
a cross-cord layer disposed adjacent the tensile members;
the body having a pulley engaging region having a profile, the pulley engaging region comprising a non-woven material infused with the elastomeric material;
the elastomeric material having a fiber loading; and
the pulley engaging region having a frictional modifier at a pulley engaging surface; and
the frictional modifier is selected from zinc stearate, calcium stearate or magnesium stearate or a combination of any two or more of the foregoing.

26. The belt as in claim 25, wherein the frictional modifier is in the elastomeric material in the amount of approximately 2 to 15 parts per hundred rubber.

27. A belt comprising:
a body comprising an elastomeric material and having tensile members extending in a longitudinal direction;
a cross-cord layer disposed adjacent the tensile members;
the body having a pulley engaging region having a profile, the pulley engaging region comprising a non-woven material infused with the elastomeric material;
the elastomeric material having a fiber loading in the range of approximately 0.01 phr to approximately 20 phr of elastomeric material; and
the elastomeric material having a predetermined amount of zinc stearate.

28. The belt as in claim 27 wherein an amount of zinc stearate is in the range of approximately 2 to 15 parts per hundred rubber.

29. A belt comprising:
a body comprising an elastomeric material and having tensile member extending in a longitudinal direction;
a substantially non-porous cross-cord layer disposed adjacent the tensile members;
the body having a pulley engaging region having a profile, the pulley engaging region comprising a non-woven material infused with the elastomeric material; and
the elastomeric material having a predetermined amount of zinc stearate.

30. The belt as in claim 29 wherein an amount of zinc stearate is in the range of approximately 2 to 15 parts per hundred rubber.

31. A belt comprising:
a body comprising an elastomeric material and having tensile members extending in a longitudinal direction;
the body having a pulley engaging region having a profile, the pulley engaging region comprising a non-woven material infused with the elastomeric material;
the elastomeric material having a fiber loading; and
the elastomeric material having a predetermined amount of a metal salt of carboxylic acid; and
the carboxylic acid is at least one selected from the group consisting of carboxylic acids possessing from 12 carbon atoms to 24 carbon atoms.

32. The belt as in claim 31 wherein an amount of metal salt of carboxylic acid is in the range of approximately 2 to 15 parts per hundred rubber.

33. The belt as in claim 32 wherein the metal salt of carboxylic acid is selected from zinc stearate, calcium stearate or magnesium stearate or a combination of any two or more of the foregoing.

34. The belt as in claim 31 wherein the carboxylic acid is selected from lauric, myristic, oleic, linoleic, palmitic, margaric, stearic, arachidic, behenic or lingoceric acid or a combination of any two or more of the foregoing.

35. The belt as in claim 34 wherein the metal is selected from beryllium, barium, titanium, chromium, molybdenum, manganese, iron, cobalt, nickel, copper, silver, cadmium, tin, lead, antimony, zinc, calcium, magnesium, sodium, lithium, potassium, or aluminum or a combination of any two or more of the foregoing.

36. The belt as in claim 31 further comprising a substantially non-porous cross-cord layer disposed adjacent the tensile members.

37. The belt as in claim 36 wherein the non-porous cross-cord layer comprises tire-cord.

38. A belt comprising:
a body comprising an elastomeric material and having tensile members extending in a longitudinal direction;
the body having a pulley engaging region having a profile, the pulley engaging region comprising a non-woven material infused with the elastomeric material;

the elastomeric material having a predetermined amount of a metal salt of carboxylic acid; and the carboxylic acid is at least one selected from the group consisting of a carboxylic acid possessing from 12 carbon atoms to 24 carbon atoms.

39. The belt as in claim 38 wherein an amount of metal salt of carboxylic acid is in the range of approximately 2 to 15 parts per hundred rubber.

40. The belt as in claim 39 wherein the metal salt of carboxylic acid is selected from zinc stearate, calcium stearate or magnesium stearate or a combination of any two or more of the foregoing.

41. The belt as in claim 40 further comprising a substantially non-porous cross-cord layer disposed adjacent the tensile members.

42. The belt as in claim 41 wherein the non-porous cross-cord layer comprises tire-cord.

43. The belt as in claim 38 wherein the carboxylic acid is selected from lauric, myristic, oleic, linoleic, palmitic, margaric, stearic, arachidic, behenic or lingoceric acid or a combination of any two or more of the foregoing.

44. The belt as in claim 38 wherein the metal is selected from beryllium, barium, titanium, chromium, molybdenum, manganese, iron, cobalt, nickel, copper, silver, cadmium, tin, lead, antimony, zinc, calcium, magnesium, sodium, lithium, potassium, or aluminum or a combination of any two or more of the foregoing.

45. A belt comprising:
a body comprising an elastomeric material and having tensile members extending in a longitudinal direction;
the elastomeric material having a fiber loading; and
the elastomeric material having an amount of zinc stearate equal to or greater than 5.0 phr.

46. The belt as in claim 45, wherein the fiber loading is in the range of approximately 0.01 phr to approximately 20 phr of elastomeric material.

47. The belt as in claim 45, wherein the amount of zinc stearate is approximately 5.7 phr.

48. The belt as in claim 45, wherein the elastomeric material comprises EPDM, SBR, HNBR, polychloroprene, and combinations of two or more of the foregoing.

49. A belt comprising:
a body comprising an elastomeric material and having tensile members extending in a longitudinal direction;
the body having a pulley engaging region having a profile, the pulley engaging region comprising a non-woven material infused with the elastomeric material;
the elastomeric material having a predetermined amount of a metal salt of carboxylic acid; and
the carboxylic acid is selected from lauric, myristic, oleic, linoleic, palmitic, margaric, stearic, arachidic, behenic or lingoceric acid or a combination of any two or more of the foregoing.

50. The belt as in claim 49, wherein the elastomeric material comprises EPDM, SBR, HNBR, polychloroprene, and combinations of two or more of the foregoing.

51. A belt comprising:
a body comprising an elastomeric material end having tensile members extending in a longitudinal direction;
the body having a pulley engaging region having a profile, the pulley engaging region comprising a non-woven material infused with the elastomeric material; and
the elastomeric material having an amount of zinc stearate equal to or greater then 5.0 phr.

52. The belt as in claim 51, wherein the amount of zinc stearate is approximately 5.7 phr.

53. The belt as in claim 51, wherein the elastomeric material further comprises a fiber loading in the range of approximately 0.01 phr to approximately 20 phr.

* * * * *